Figures 8, 9:
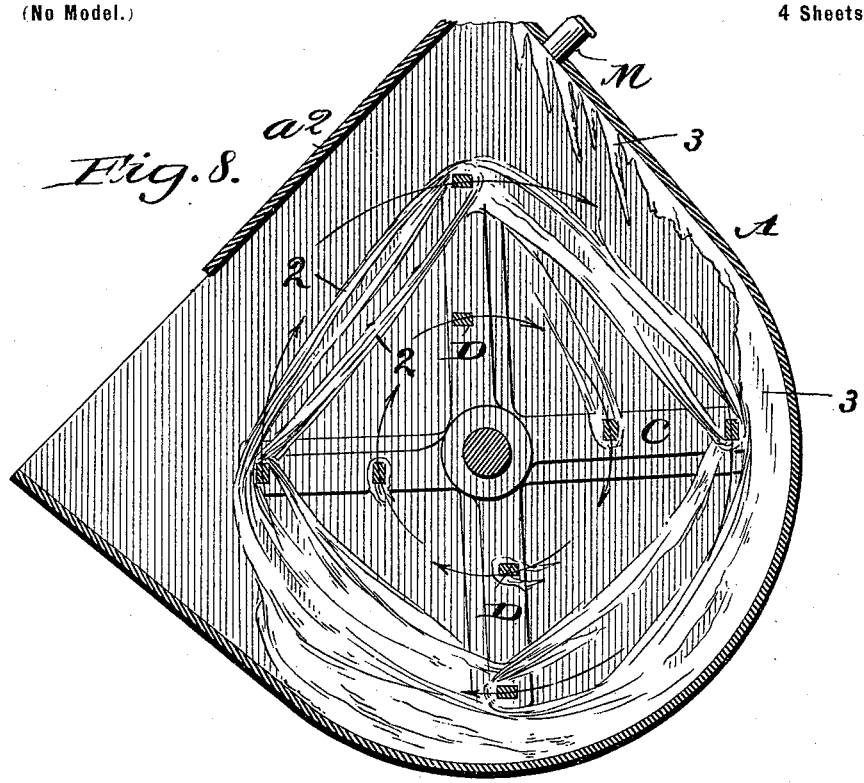

No. 639,889. Patented Dec. 26, 1899.
W. S. & C. I. CORBY.
MACHINE FOR MAKING DOUGH IN MANUFACTURING FERMENTED BREAD.
(Application filed Nov. 19, 1897.)
(No Model.) 4 Sheets—Sheet 1.
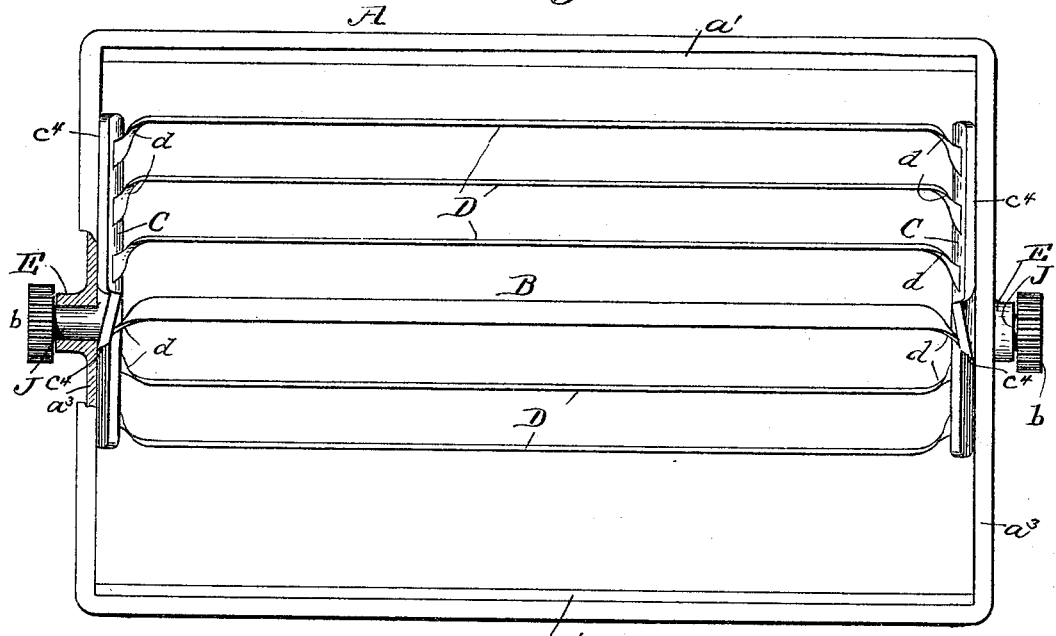
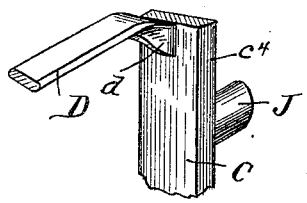
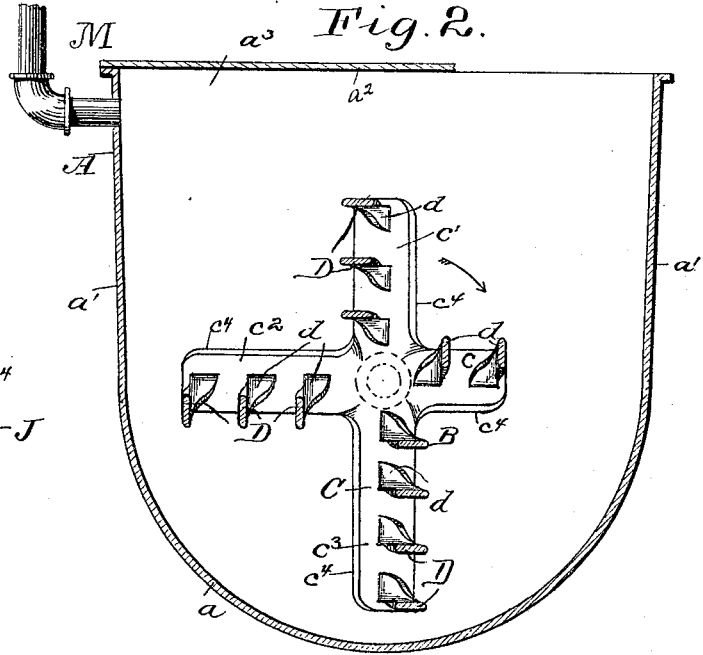
Witnesses,
Chas. W. Parker
George T. May Jr.
Inventors:
William S. Corby and
Charles I. Corby
By J. S. Barker atty.

No. 639,889. Patented Dec. 26, 1899.
W. S. & C. I. CORBY.
MACHINE FOR MAKING DOUGH IN MANUFACTURING FERMENTED BREAD.
(Application filed Nov. 19, 1897.)
(No Model.) 4 Sheets—Sheet 2.
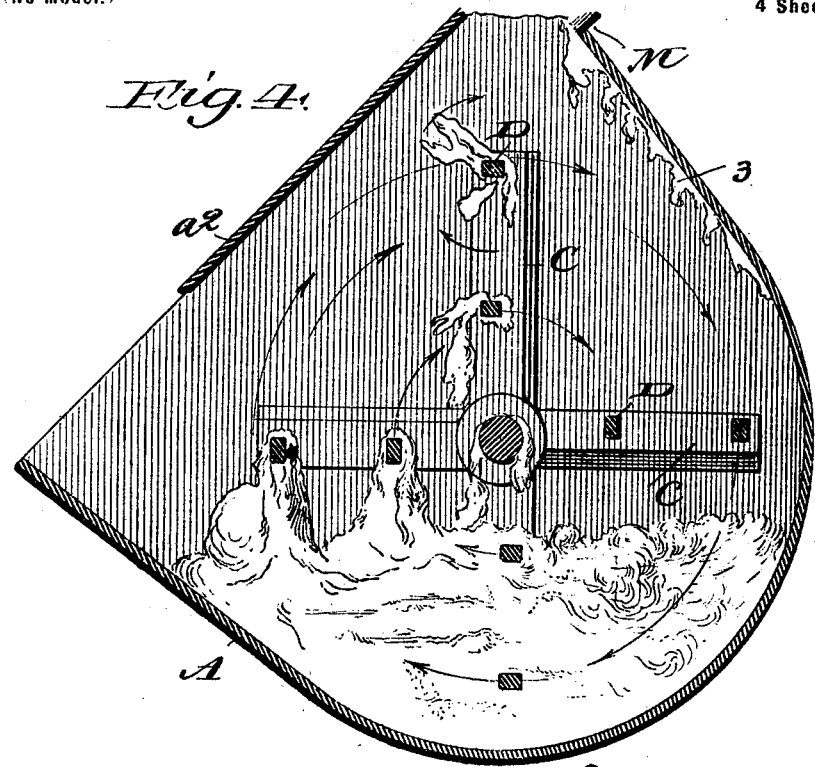
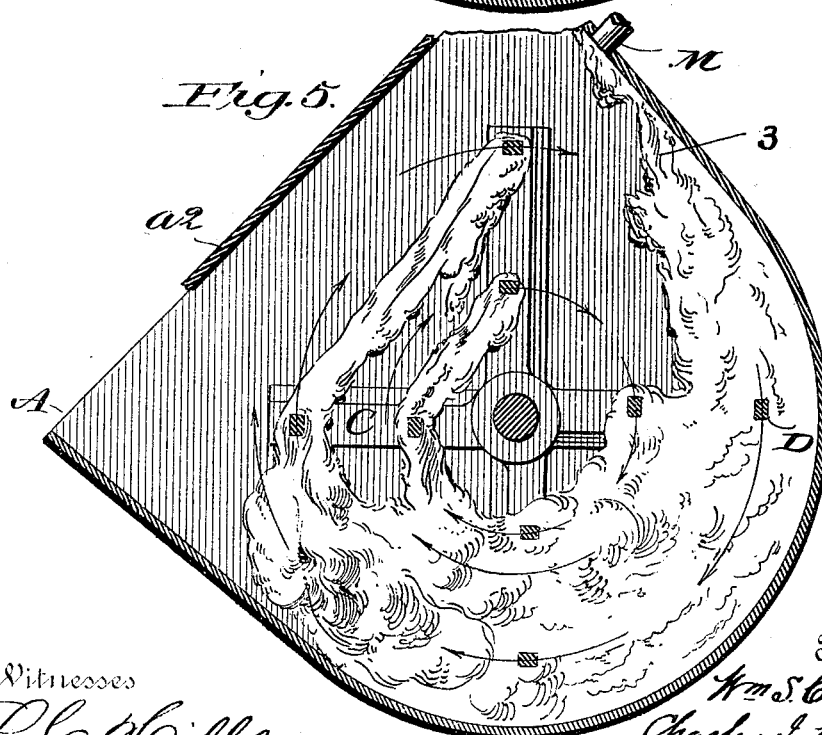

No. 639,889. Patented Dec. 26, 1899.
W. S. & C. I. CORBY.
MACHINE FOR MAKING DOUGH IN MANUFACTURING FERMENTED BREAD.
(Application filed Nov. 19, 1897.)
(No Model.) 4 Sheets—Sheet 3.
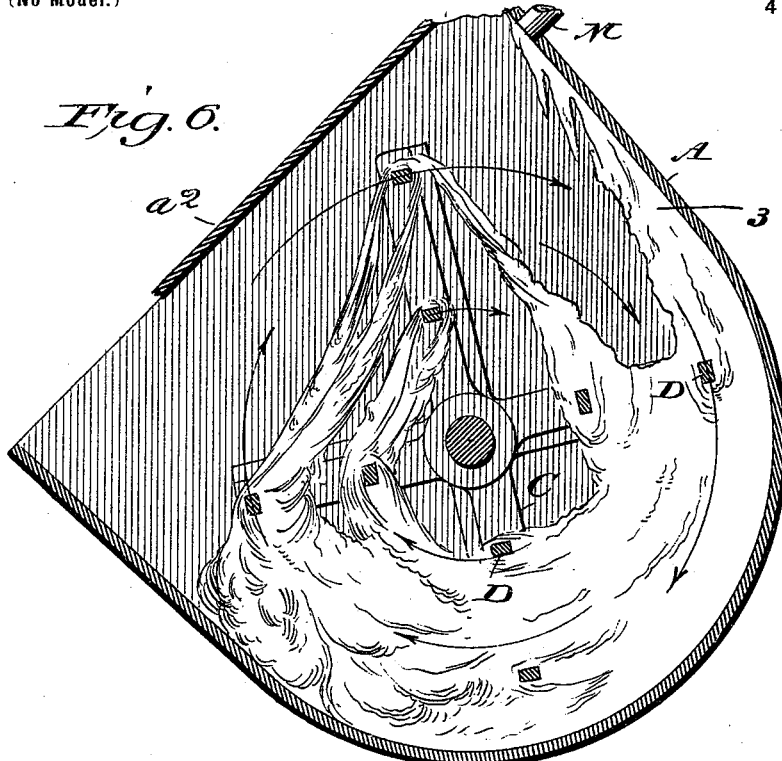
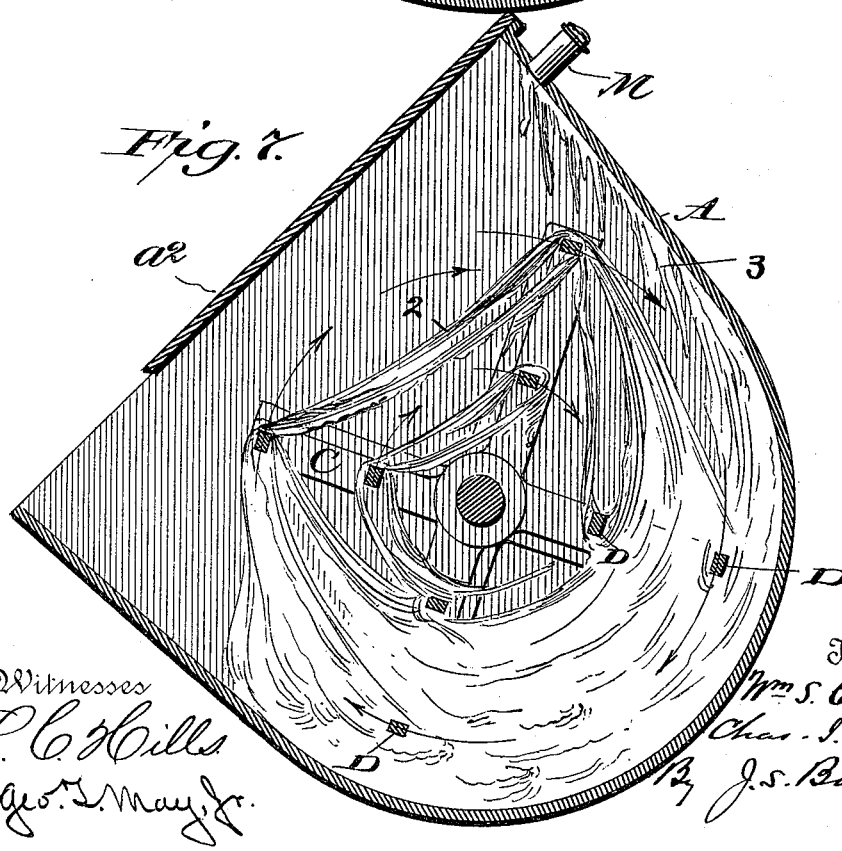

No. 639,889. Patented Dec. 26, 1899.
W. S. & C. I. CORBY.
MACHINE FOR MAKING DOUGH IN MANUFACTURING FERMENTED BREAD.
(Application filed Nov. 19, 1897.)
(No Model.) 4 Sheets—Sheet 4.

Witnesses
L. C. Hills.
Geo. T. May Jr.

Inventors
William S. Corby and
Charles I. Corby
By J. S. Barker
Attorney

UNITED STATES PATENT OFFICE.

WILLIAM S. CORBY AND CHARLES I. CORBY, OF WASHINGTON, DISTRICT OF COLUMBIA.

MACHINE FOR MAKING DOUGH IN MANUFACTURING FERMENTED BREAD.

SPECIFICATION forming part of Letters Patent No. 639,889, dated December 26, 1899.

Application filed November 19, 1897. Serial No. 659,109. (No model.)

*To all whom it may concern:*

Be it known that we, WILLIAM S. CORBY and CHARLES I. CORBY, citizens of the United States, residing at Washington, in the District of Columbia, have invented certain new and useful Improvements in Machines for Making Dough in the Manufacture of Fermented Bread, of which the following is a specification.

Our invention has for its object to improve the art of making dough in the manufacture of fermented or leavened bread; and it consists of a novel machine or apparatus for making, mixing, and manipulating the dough.

In the accompanying drawings, wherein the preferred form of apparatus embodying our invention is illustrated, Figure 1 is a top plan view of the apparatus, part of the mixing chamber or vessel being broken away and the cover being entirely removed. Fig. 2 is a transverse sectional view. Fig. 3 is a detail view in perspective of part of the beater. Figs. 4 to 8 are transverse sectional views of the apparatus, illustrating its action upon a mass of dough being made therein, the mixing vessel being represented somewhat inclined from a vertical position, such being the position we prefer it should occupy after the beater has been operated a few seconds. Fig. 9 is a perspective view of a part of the beater, showing the appearance of the dough thereon, the dough being represented as in a practically completed or finished condition.

In the drawings, A represents the vessel or chamber in which the ingredients—such as flour, water, salt, yeast, &c.—are placed and where the mixing of these and the dough making and manipulation take place. It has a half-cylindrical lower portion $a$, straight sides $a'$ above such curved part, a cover $a^2$, and ends $a^3$. Within this vessel is mounted a beater B, which during the mixing and dough-manipulating operations is caused to revolve rapidly. Any suitable driving means for the beater may be used, provided that it is such as to insure a speed sufficiently great— as, for instance, by having suitably small gear-wheels $b$ on the beater-shaft, as shown, or by having properly-speeded driving parts, as will be well understood.

The beater consists, preferably, of two spiders C, arranged close to and on the inner sides of the ends of the mixing vessel, and a series of beater blades or bars D, carried by and connecting the spiders. Each of the spiders is provided with a short shaft or journal J, which extends out through the end of the vessel and is mounted in a bearing E. One or both of these shafts J may carry part of the high-speed gearing, through which power is transmitted to the beater. Each spider is formed with a number of radial arms, preferably four, $c\ c'\ c^2\ c^3$, the arms being of different lengths, as shown in Fig. 2, and each arm from $c$ to $c^3$ being longer than the one next in front of it. The beater-bars D are preferably so arranged upon the arms of the spiders relative to the center or axis of the beater that no two of them travel in exactly the same path, this arrangement insuring a perfect and rapid mixing of the ingredients and a thorough beating and manipulation of the dough.

In order to prevent the dough material within the vessel A from collecting between the spiders and the ends of the working chamber, and hence escaping the action of the beater-blades, we mount the spiders close to the ends of the vessel and provide the arms thereof with scraping edges $c^4$, which travel close to the end walls of the chamber and remove any dough material which may collect upon or stick to such walls. The material thus removed should be carried far enough from the ends and toward the center of the chamber to be acted upon by the revolving beater-bars, and to insure this we preferably make the spider-arm sflat and incline them inward or away from the end of the working chamber from their front scraping edges $c^4$ to their rear edges, as represented in Figs. 1 and 3. To still further carry the material inward and into the path of the beaters, we prefer that the beater blades or bars D should be bent rearward, as represented at $d$, near their ends where they unite with the spiders, and when such bars are angular in cross-section, as in the construction represented, that they should be slightly twisted at the places where they are thus bent rearward.

In using our apparatus the ingredients of which the dough is to be formed are placed within the vessel, the cover is closed, and the beater started and run at high speed. This operation quickly results in the making of a perfect dough—that is to say, a dough in which every particle of the gluten-forming ingredients of the flour is brought into contact with the necessary quantity of water, which results in the hydration thereof and the consequent formation of gluten and also a dough in which there is a complete, perfect, and uniform distribution of the yeast particles throughout the entire dough mass and an aeration or working of air into and through the mass.

We are well aware of the fact that machines of various sorts have heretofore been invented and used for the initial mixing of the ingredients used in the manufacture of fermented or leavened bread; but machines of any and of all of the sorts which are known to us as being used or proposed for the making of dough have been different in structure from our machine and in their mode of operation as concerns the preparation and making of dough for fermented or leavened bread. With such earlier machines all that was proposed or sought to be attained by their use was to effect a mixing of the ingredients to the same degree as that ordinarily attained by the making of dough by hand. There was no machine within our knowledge and prior to our present invention which was capable of effecting a combined mixing and initial kneading or manipulation of the dough and by which the production of a dough of practically uniform texture throughout could be attained—that is to say, a dough in which both the starch and the gluten-forming ingredients of the flour are all completely hydrated. This is shown by the fact that the doughs made by hand and by the machines now in vogue contain throughout their entire mass particles of flour perfectly dry or but partially hydrated, whereas the dough made by our apparatus is, so far as tests can determine, of perfectly uniform texture or consistency and is perfectly hydrated throughout.

It may here be stated that by the terms "hydration" and "hydrate" as used in this specification we refer to the union between the water and the constituents of the flour which takes place when these are properly brought together in the making of dough, whether such union be of a chemical or of a merely physical nature.

In prior machines of one sort it was proposed to effect the mixing by means of blades turning very slowly, (fifteen times, or thereabout, per minute.) These blades were arranged parallel to the axis and were supported by a series of pairs of radial arms, such arms being of uniform length. Each pair of arms carried an outermost blade which moved relatively near to the wall of the vessel and generally one or more inner blades nearer the axis and approximately parallel to the outermost blade, each pair of arms, with its blade or blades, acting during each revolution upon the material in the same way and along the same lines as did each other pair of arms and its blade or blades; but with such machines, operating in the way described it is impossible to obtain the results which we accomplish and which results will be hereinafter more fully set forth, and such machines have generally been superseded by machines of the following sort: Machines of this second-class, which are in common use, are characterized by having spirally-arranged blades or mixing-bars, one or more, with rotating devices which revolve them slowly. Here another species of result is obtained. After the mixing-blades have been in operation a short time the mass of material assumes a relatively compact condition, all of its parts tending to adhere together, and from the instant it reaches this stage the action of the spiral blades is merely to roll or turn the dough mass over and over, mainly from one end of the receptacle to the other, and if during the initial stage of the mixing operation there has been a failure to attain a thorough commingling of the ingredients, as in practice is invariably the case, they necessarily remain thereafter improperly mixed, and a complete hydration of all the gluten-forming particles of the flour is practically impossible during the mixing operation. It is because of this imperfect formation of a satisfactory dough incident to the construction of the machines heretofore used in initially mixing the dough ingredients that the dough must, according to the processes now in vogue, stand for long periods of time in the receptacles in which it is placed after the initial mixing and be again and again worked, kneaded, or "knocked down" by hand in order to develop the gluten of the flour in anything like a satisfactory manner. The objections incident to this method of procedure both in loss of time and the impairment of the dough resulting from the long time it has to stand after the initial mixing are too well known to those skilled in the art to require being here stated.

As distinguished from the machines heretofore referred to employing slowly-driven mixing-bars or blades we employ in our apparatus a high-speed centrifugal beater—that is to say, a beater so geared as to be rotated with a speed far greater than that attained in any of the machines known to us and which is sufficiently high to cause it to operate upon the dough with a centrifugal action. The radially-projecting arms of the spiders being, as aforesaid, of different lengths and the beater-bars carried thereby being arranged at different distances from the axis of the beater, the outermost blades pass through the parts of the dough material nearest the wall of the mixing vessel, those at a less distance from the axis pass through the mass somewhat nearer the center of the vessel, and so on more or less gradually to the innermost blades, this arrangement and operation of the blades insuring a very perfect treatment of the dough material and at the same time operating to sheet or shred the dough material (as will be presently pointed out) in a very perfect and satisfactory manner. These two characteristics of our machine—the high-speed centrifugal beater and the peculiar arrangement of the blades thereof—cause the dough material to be thrown outward by centrifugal action against the walls of the vessel, whence it is gathered up by the successively-passing bars of the beater, so that the working or manipulation of the dough material takes place, particularly after the gluten has been fairly well developed, almost exclusively between the walls of the vessel and the paths followed by the beater-bars of the outermost set. This operation is entirely novel in the art, as we believe, and it results in the production of a dough so different from that produced by the ordinary methods of manufacture now in vogue, whether such manufacture be by hand or by machinery, as to be instantly distinguishable therefrom and which is a very superior article of manufacture.

We will now describe the operation of our machine, and to assist in an understanding of such description make reference to Figs. 4 to 9 of the drawings.

During the first stage of action of the machine (just after the proper quantities of dry flour, yeast, water, &c., have been introduced into the vessel A and the beater has run for a short time—a minute, more or less—at a high speed) the blades or bars of the beater cause a series of rapidly-recurring cycles of agitation of the mass, throwing the material into the air above or in the upper part of the vessel and at the same time rapidly and violently mixing the materials among themselves. This action is continued for two or three minutes, and the appearance of the material during this stage of action is represented in Fig. 4. During the next stage of action—and it should be understood that the operation of the machine is continuous from start to finish and that there is no clear line of demarcation between the several stages of action which we refer to, one stage gradually merging or changing into the next in succession—another peculiarity of our process is developed or becomes apparent—namely this, that the material is formed into vast numbers of minor masses which are detached from the main mass of material lying in the lower part of the vessel and are by the beater thrown up and carried around upon the beater-bars, showing that there has been a rapid development of the gluten, producing a strong adherence between particle and particle of the imperfectly-formed dough. This stage in the operation of the machine is illustrated in Fig. 5 and usually is arrived at in five or six minutes after the beater is started.

It may here be stated that the condition of the partially-formed dough as it exists at the end of the first stage or step above described and before it arrives at the end of the second stage is similar to that of the dough as made by the processes now in vogue after it has been worked in a machine the full length of time and is ready to be put into the troughs for developing.

The next step in the development of the dough as treated by our machine is represented in Figs. 6 and 7, which illustrate the further and rapid development of the gluten, with the attendant strengthening of the dough. The relatively minor masses of dough are broken away from the main mass during the second stage of action and, as illustrated in Fig. 5, adhere with each other and with the main mass to a greater and greater extent during this third stage of action. It is during this third stage of action that the development of the gluten is carried far beyond what it has heretofore been possible to attain, the operation of our machine having caused the particles of flour, of water, and of yeast to be brought into such close and intimate and proper relations as to thoroughly hydrate the gluten-forming constituents of the flour and to permeate the entire mass with the yeast, thus rapidly carrying forward the formation of a perfect dough. This development of the gluten beyond that which is accomplished at the initial mixing is attained by the action of the high-speed beater, the blades of which have sufficient peripheral speed to draw out the dough mass portion after portion into a great number of strings or threads or membranes or sheets 2 2, the coherence of the different parts of the mass by this time having been so enhanced by the rapid and complete breaking up and disintegration of the little clusters or nodules of mutually-adhering particles of flour as to permit the dough to extend from blade to blade in folds, sheets, membranes, and strings, as indicated at 2 in Figs. 6 and 7. The rapid production of the gluten so apparent at this stage of action (caused by the peculiar action of the centrifugal beater arms or bars) in turn assists in attaining this shredding, sheeting, or membrane-forming of the material, so that an increasingly large portion of the mass of material is during this stage of action taken up and carried around by the arms of the beater, and a corresponding less portion of the material is allowed to gather in mass form in the lower portion of the vessel A.

The final stage of action represented in the accompanying drawings—that illustrated in Figs. 8 and 9—and the stage at which it is usually found practicable to cease the operation of the machine results in the formation of a practically perfect dough—that is to say, a dough which under the most careful tests is shown to be homogeneous and completely mixed, there being a practically perfect hydration of every gluten-forming particle of the flour with a correspondingly perfect dissemination of the yeast particles throughout the entire mass. The strength of this dough is so great, showing the perfect development of the gluten, that practically the entire mass thereof within the vessel A is supported upon the outer series of bars D, encircling in sheets, folds, and membranes of dough the periphery of the beater again and again. As showing the strength of the dough at this stage it may be stated that it may be drawn out into filaments or threads three feet or more in length and into sheets or membranes as thin as paper.

The operation of the machine just described in forming the dough into sheets or membranes which as they are drawn out and formed are folded over one upon the other again and again as the beater rapidly revolves results in the inclosing or imprisoning of air, which may enter the vessel A through the pipe M, in and between the folds or layers of the sheets or membranes 2 2, as best represented in Figs. 8 and 9, so that the dough as formed by our process is thoroughly aerated and is in a very light condition due to the action of the machine.

These characteristic and distinctive functions and results of our apparatus cannot possibly be attained with those heretofore used, as the mixing-bars or blades of the latter are so constructed, arranged, and actuated that they do not have a centrifugal effect or action on the dough, but rather the dough slips from one blade after another as they are slowly moved past or through the dough mass and centrifugal action due to the motion of the beater performs practically no part in the operation of the apparatus, whereas in our machine the dough is whirled around the peripheral region of the beater so rapidly that slipping or disengagement of the blades from the dough is impossible after the gluten has begun to be developed to some extent, after which the stretching, pulling, and drawing out of the dough mass into infolding layers or membranes necessarily takes place. It is to be understood that the walls of the vessel A coöperate with the high-speed beater, as they operate to retard the forward movements of the dough masses which are by centrifugal action thrown against and caused to stick to such walls, as represented at 3 3, whence it (the dough) is being constantly drawn away by the blades or bars of the beater.

To one observing our machine while at work it is at once obvious that its parts are so arranged and so actuated as to attain the desiderata of the baker's art—namely, the rapid, thorough, uniform, and perfect formation or manufacture in one initial operation of a dough wherein the gluten is completely developed, the yeast is uniformly and thoroughly disseminated, and the dough is aerated.

What we claim as new, and desire to secure by Letters Patent, is—

1. In a machine for making dough, the combination of the inclosing vessel, a rotary beater mounted therein, means for removing the dough from the ends of the said vessel, and means for forcing the material so removed toward the center of the vessel, substantially as set forth.

2. In a machine adapted for making dough, the combination of the inclosing vessel, the revolving arms arranged within the said vessel and close to the ends thereof, and provided with means for removing the dough from the ends of the vessel, and the beater blades or bars carried by the said arms, such blades or bars being bent rearward, as at b, near their ends, and where they are connected with the said revolving arms, substantially as set forth, 3. In a machine for making dough, the combination of an inclosing vessel and a single, high-speed, centrifugal beater mounted upon a horizontal axis within the vessel, such beater being provided with beater-bars substantially parallel with its axis, said bars being arranged in sets, and the outermost bar of each set being successively farther from the axis of the beater than the one preceding it, substantially as set forth.

WILLIAM S. CORBY.
CHARLES I. CORBY.

Witnesses:
C. A. BARKER,
J. S. BARKER.